(12) United States Patent
Gupta et al.

(10) Patent No.: US 9,380,166 B2
(45) Date of Patent: Jun. 28, 2016

(54) DYNAMICALLY CONSTRUCTING AND UPDATING SOCIAL MEDIA STATUS FOR USE AS RINGBACK TONES

(71) Applicant: GLOBALFOUNDRIES INC., Grand Cayman (KY)

(72) Inventors: Sachin Gupta, New Delhi (IN); Arun Kumar, Noida (IN)

(73) Assignee: GLOBALFOUNDRIES INC., Grand Cayman (KY)

(*) Notice: Subject to any disclaimer, the term of this patent is extended or adjusted under 35 U.S.C. 154(b) by 91 days.

(21) Appl. No.: 14/092,129

(22) Filed: Nov. 27, 2013

(65) Prior Publication Data

US 2015/0148014 A1    May 28, 2015

(51) Int. Cl.
| | | |
|---|---|---|
| *H04M 7/12* | (2006.01) | |
| *H04L 12/58* | (2006.01) | |
| *H04W 4/16* | (2009.01) | |

(52) U.S. Cl.
CPC ............ *H04M 7/129* (2013.01); *H04L 51/02* (2013.01); *H04W 4/16* (2013.01); *H04L 51/14* (2013.01); *H04L 51/32* (2013.01)

(58) Field of Classification Search
USPC ........................................ 455/414.1; 4/414.1
See application file for complete search history.

(56) References Cited

U.S. PATENT DOCUMENTS

| | | | |
|---|---|---|---|
| 8,478,246 B2* | 7/2013 | Wang et al. ................. 455/414.1 |
| 2007/0005431 A1* | 1/2007 | Arauz ............................. 705/14 |
| 2007/0168462 A1* | 7/2007 | Grossberg et al. ............ 709/217 |
| 2008/0037740 A1* | 2/2008 | Yoakum et al. .......... 379/142.01 |
| 2009/0232285 A1* | 9/2009 | Mani ........................... 379/88.18 |
| 2010/0014647 A1* | 1/2010 | Subramaniam ................. 379/87 |
| 2010/0151824 A1* | 6/2010 | Shang et al. ................... 455/411 |
| 2010/0216509 A1* | 8/2010 | Riemer et al. ................. 455/557 |
| 2011/0176669 A1* | 7/2011 | Seelig ....................... 379/207.16 |
| 2011/0312305 A1* | 12/2011 | Jajodia et al. ............... 455/414.1 |
| 2011/0320980 A1* | 12/2011 | Hand et al. ..................... 715/828 |

(Continued)

FOREIGN PATENT DOCUMENTS

| | | |
|---|---|---|
| EP | 2184909 A1 | 12/2010 |
| WO | WO2013014679 A1 | 1/2013 |

OTHER PUBLICATIONS e-sense, The Essence of Telecom, "Caller Ring Back Tone," Copyright 2008-2009, 1 page, can be found at URL: http://www.e-sense.co.in/inner.php?id=20, Accessed Oct. 30, 2013.

(Continued)

*Primary Examiner* — Jinsong Hu
*Assistant Examiner* — Jean Chang
(74) *Attorney, Agent, or Firm* — Scully Scott Murphy and Presser

(57) ABSTRACT

Methods and arrangements for constructing ringback tones. A contemplated method includes: obtaining data pertaining to a first user of a communication medium from one or more communication channels comprising at least one channel selected from the group consisting of: an enterprise system, a personal social network, personal information derived from the communication medium, a contacts list, an instant messaging system, a professional social network, and a personal blog; and when a second user attempts communication with the first user via the communication medium: dynamically and automatically constructing a status update based on the obtained data; and using the constructed status update as a ringback tone. Other variants and embodiments are broadly contemplated herein.

20 Claims, 2 Drawing Sheets

(56) References Cited

U.S. PATENT DOCUMENTS

| | | | |
|---|---|---|---|
| 2012/0106717 A1* | 5/2012 | Dong et al. | 379/70 |
| 2012/0232978 A1* | 9/2012 | Steul et al. | 705/14.25 |
| 2013/0157629 A1* | 6/2013 | Lee et al. | 455/414.1 |
| 2014/0066033 A1* | 3/2014 | Lee et al. | 455/414.1 |

OTHER PUBLICATIONS realnetworks, Worldwide Premium Mobile Entertainment, "Ringback Tones & Personalization," Jan. 2010, 4 pages, can be found at URL: http://www.realnetworks.com/uploadedFiles/products-seryices/Ringback-Tones.pdf, Accessed Oct. 30, 2013.

* cited by examiner

DYNAMICALLY CONSTRUCTING AND UPDATING SOCIAL MEDIA STATUS FOR USE AS RINGBACK TONES

BACKGROUND

Generally, for mobile phones, ringback tones can be customized; these are tones (e.g., musical selections) that a caller will hear when he/she calls into another person's phone and until the phone call is connected or otherwise terminated (e.g., the callee picks up, or the call otherwise transfers to voicemail). Conventional arrangements allow either static play back or some degree of limited personalization. As such, the user is typically able to manually select a recording to be used for a ringback tone, though these settings are usually only personalized based upon the caller alone. Such an arrangement has proven to be highly limiting and non-versatile.

BRIEF SUMMARY

In summary, one aspect of the invention provides a method of automatically constructing a status update to be used as a ringback tone, the method comprising: obtaining data pertaining to a first user of a communication medium from one or more communication channels comprising at least one channel selected from the group consisting of: an enterprise system, a personal social network, personal information derived from the communication medium, a contacts list, an instant messaging system, a professional social network, and a personal blog; and when a second user attempts communication with the first user via the communication medium: dynamically and automatically constructing a status update based on the obtained data; and using the constructed status update as a ringback tone.

Another aspect of the invention provides an apparatus for automatically constructing a status update to be used as a ringback tone, the apparatus comprising: at least one processor; and a computer readable storage medium having computer readable program code embodied therewith and executable by the at least one processor, the computer readable program code comprising: computer readable program code configured to obtain data pertaining to a first user of a communication medium from one or more communication channels comprising at least one channel selected from the group consisting of: an enterprise system, a personal social network, personal information derived from the communication medium, a contacts list, an instant messaging system, a professional social network, and a personal blog; and computer readable program code configured, when a second user attempts communication with the first user via the communication medium, to: dynamically and automatically construct a status update based on the obtained data; and use the constructed status update as a ringback tone.

An additional aspect of the invention provides a computer program product for automatically constructing a status update to be used as a ringback tone, the computer program product comprising: a computer readable storage medium having computer readable program code embodied therewith, the computer readable program code comprising: computer readable program code configured to obtain data pertaining to a first user of a communication medium from one or more communication channels comprising at least one channel selected from the group consisting of: an enterprise system, a personal social network, personal information derived from the communication medium, a contacts list, an instant messaging system, a professional social network, and a personal blog; and computer readable program code configured, when a second user attempts communication with the first user via the communication medium, to: dynamically and automatically construct a status update based on the obtained data; and use the constructed status update as a ringback tone.

A further aspect of the invention provides a method of automatically constructing a status update to be used as a ringback tone, the method comprising: obtaining data pertaining to a user of a mobile phone from one or more communication channels; the data pertaining to a user comprising at least one of: an event associated with the user and content associated with the user; the one or more channels comprising at least one channel selected from the group consisting of: an enterprise system, a social network, personal information, a contacts list, an instant messaging system, a professional social network, and a personal blog; the one or more channels being selected via determining at least one of: a category of the caller, and a degree of connectivity of the caller with the user; dynamically and automatically constructing a status update based on the obtained data; configuring rules to assist in matching the caller to at least one channel; and using the constructed status update as a ringback tone.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
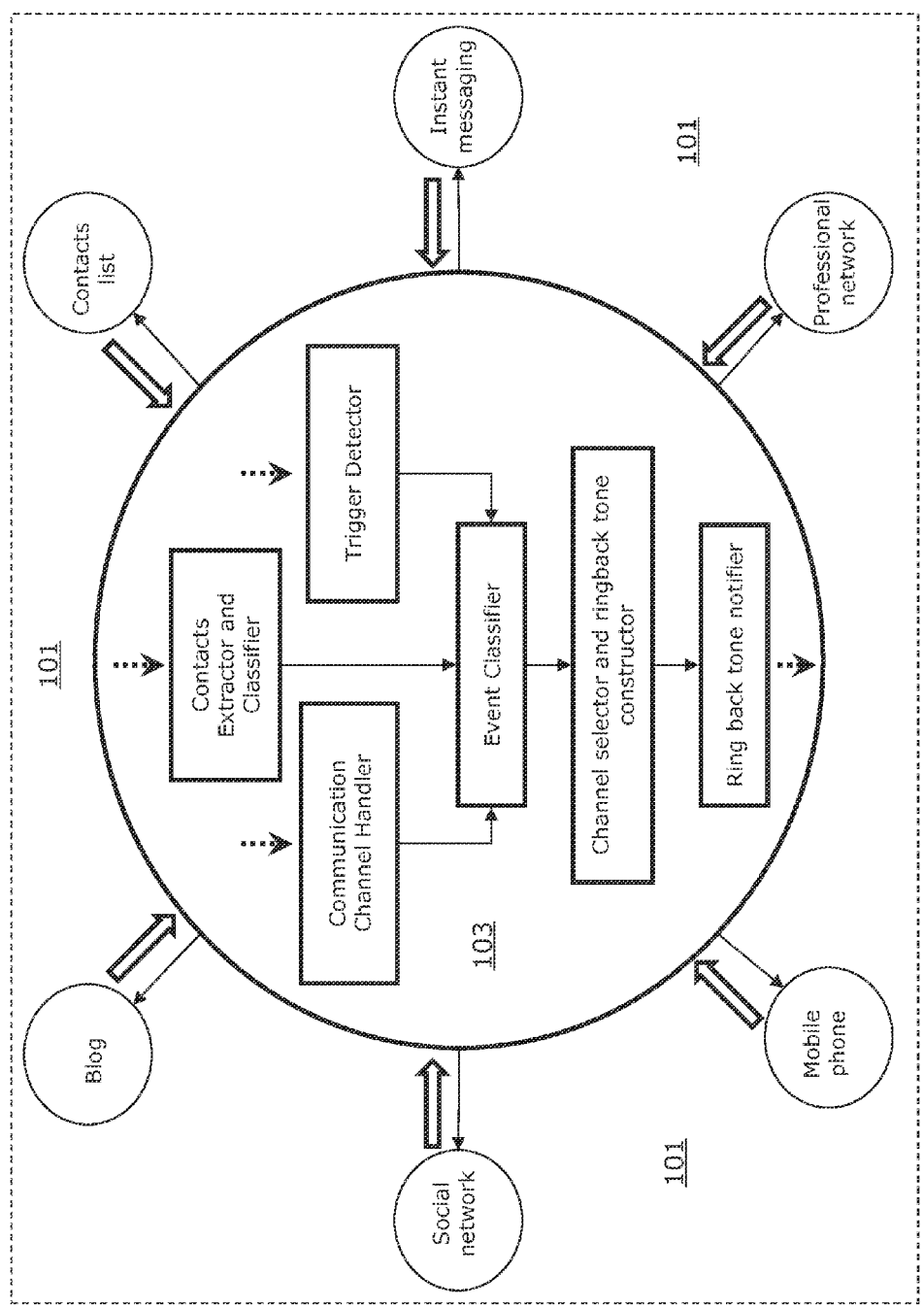
FIG. 1 schematically illustrates a system for dynamically constructing and updating status from federated networks for use as ringback tones.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

FIG. 1 schematically illustrates a system for dynamically constructing and updating a status from federated networks for use as a ringback tone, in accordance with at least one embodiment of the invention. Details of such a system can be appreciated from the discussion herebelow.

Broadly contemplated herein, in accordance with at least one embodiment of the invention, are systems and arrangements which permit users to set a ringback tone based upon status updates that may occur in various other communication channels of the user, and based upon the context of the user inferred automatically from his/her status updates.

Accordingly, broadly contemplated herein, in accordance with at least one embodiment of the invention, are systems and methods for dynamically and automatically constructing personalized status updates to be used as ringback tones. This recognizes different possible classifications for contacts, e.g.: internal (work) colleagues, external colleagues or partners, from a general professional network, from a personal network, friends and family, etc. From this, there can be recognized a categorization and listing of different communication channels, e.g., enterprise (instant messaging, intranet databases and services such as blogs etc.), social (including social networks and phone-to-phone instant messaging systems), professional (including professional social networks, professional societies etc.) and personal (phonebook contacts, personal blog etc.).

In accordance with at least one embodiment of the invention, FIG. 1 schematically illustrates an arrangement as just described. As shown, a set of sources 101 for constructing ringback tones can be accessed, and this may include, though need not be limited to: a user's personal blog; a social network; a contacts list; a mobile phone instant messaging system; a professional social network; and data from a mobile phone itself. Each of these may be in communication, as shown, with a system 103 for constructing ringback tones. In a manner to be better appreciated here below, system 103 receives input from the sources 101 and directs it, as appropriate, to any or all of: a communication channel handler, a contacts extractor and classifier, and a trigger detector. An event classifier then accepts input from any or all of these three components, and sends data to a channel selector and ringback tone constructor. A ringback tone notifier then directs a ringback tone to be used by the mobile phone, but this can also be directed to any other of the sources 101 and used through any associated communication channels as may be suitable, appropriate or desired.

Broadly contemplated herein, in accordance with at least one embodiment of the invention, is the use of relevant triggers for each of the categories mentioned above. Particularly, triggers can be identified (via the trigger detector) that can affect a ringback tone, e.g., status updates in a social network, a skill set addition in a professional social network, a new posting on a blog, an award received in an office (as communicated through any channel), etc. An initial mapping between a contact's ST ID (structural identification) and other information such as phone number, social media ID, etc., are either specified manually once at setup time or learnt by the system over time.

Broadly contemplated herein, in accordance with at least one embodiment of the invention, are manners for event classification (via the event classifier), and associated rules. For instance, the event classifier can establish that events can be implicit (birthday/anniversary) as well as explicit (ST status update, social media status update). Status updates, which are propagated by way of a ringback tone, can be automatically constructed, e.g., "available in next 15 minutes after this client meeting". A UI (user interface) can be provided for configuring the rules, e.g., via including a priority list of event channels based upon caller class and/or a priority list of event types within an event channel.

In accordance with at least one embodiment of the invention, connectivity strength of the caller with the user can be considered, e.g., through CDRs (call data records), through social media exchanges, other historical exchanges, etc. Connectivity strength can thereby be used to compute the strongest context applicable to a caller. (This can be the function of the contacts extractor/classifier. Further, contacts need not only rely on contacts on the phone; for instance, connection with a person can be established via a history of interaction over instant messaging, and through other enterprise and personal networks from which contact data are accessible.) For instance, it could be established that no channel may apply to a stranger, and thus no status updates from them will be allowed. Similarly, a person connected more strongly, e.g., under an enterprise or professional category, can receive more priority (in constructing ringback tones) for updates considered relevant, such as enterprise updates. A manual override option with fixed update can be provided. The state of a user can be inferred from updates, and an appropriate ringback tone can be created on the basis of such an inferred state.

In accordance with at least one embodiment of the invention, event notification can be computed on every call. This can be a function of caller class, a most appropriate communication channel category based upon connectivity strength, and a time of update (e.g., a latest time is preselected). A status update or inferred content can be played; for instance, a sad or happy state of the user can correspond to a suitable song (or song portion) to be played for personal callers.

Figure 2:
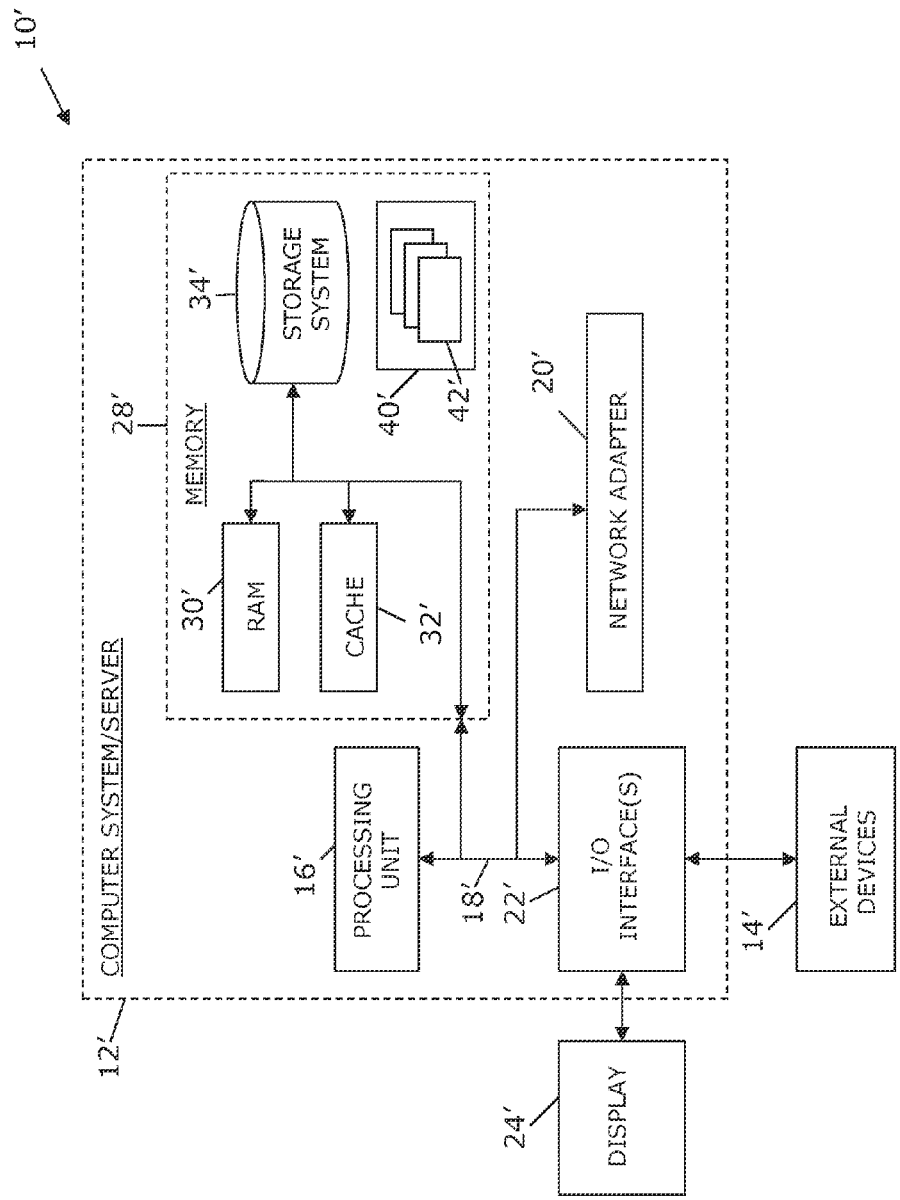
FIG. 2 illustrates a computer system.

Referring now to FIG. 2, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of automatically constructing a status update to be used as a ringback tone, said method comprising:
   when a second user attempts communication with a first user via a communication medium:
      obtaining data pertaining to the first user from one or more communication channels comprising at least one channel selected from the group consisting of: an enterprise system, a personal social network, personal information derived from the communication medium, a contacts list, an instant messaging system, a professional social network, and a personal blog, wherein the one or more channels are selected via determining a degree of connectivity of the second user with the first user;
      dynamically and automatically constructing a status update based on the obtained data; and
      using the constructed status update as a ringback tone.

2. The method according to claim 1, wherein the communication medium comprises a mobile phone.

3. The method according to claim 1, wherein the one or more channels are further selected via determining a category of the second user.

4. The method according to claim 3, comprising configuring rules to assist in matching the second user to at least one channel.

5. The method according to claim 4, wherein said configuring comprises configuring the rules to assist in matching the second user to an event associated with providing a status update in at least one of the one or more channels.

6. The method according to claim 4, comprising providing a user interface to afford said configuring of the rules.

7. The method according to claim 4, comprising automatically setting a ringback tone associated with the second user based upon identification of a status update event.

8. The method according to claim 7, wherein the communication medium comprises a mobile phone.

9. The method according to claim 7, wherein the communication medium comprises at least one of: an instant messaging client and an IP phone.

10. The method according to claim 1, wherein the data pertaining to the first user comprise at least one event associated with the first user.

11. The method according to claim 1, wherein the data pertaining to the first user comprise content associated with the first user.

12. An apparatus for automatically constructing a status update to be used as a ringback tone, said apparatus comprising:
- at least one processor; and
- a non-transitory computer readable storage medium having computer readable program code embodied therewith and executable by the at least one processor, the computer readable program code comprising: computer readable program code configured, when a second user attempts communication with the first user via the communication medium, to:
- obtain data pertaining to a first user of a communication medium from one or more communication channels comprising at least one channel selected from the group consisting of: an enterprise system, a personal social network, personal information derived from the communication medium, a contacts list, an instant messaging system, a professional social network, and a personal blog, wherein the one or more channels are selected via determining a degree of connectivity of the second user with the first user; and dynamically and automatically construct a status update based on the obtained data; and use the constructed status update as a ringback tone.

13. A computer program product for automatically constructing a status update to be used as a ringback tone, said computer program product comprising:
- a non-transitory computer readable storage medium having computer readable program code embodied therewith, the computer readable program code comprising:
- computer readable program code configured, when a second user attempts communication with the first user via the communication medium, to:
- obtain data pertaining to a first user of a communication medium from one or more communication channels comprising at least one channel selected from the group consisting of: an enterprise system, a personal social network, personal information derived from the communication medium, a contacts list, an instant messaging system, a professional social network, and a personal blog, wherein the one or more channels are selected via determining a degree of connectivity of the second user with the first user; dynamically and automatically construct a status update based on the obtained data; and use the constructed status update as a ringback tone.

14. The computer program product according to claim 13, wherein the communication medium comprises a mobile phone.

15. The computer program product according to claim 13, wherein the one or more channels are further selected via determining a category of the second user.

16. The computer program product according to claim 15, wherein said computer readable program code is configured to afford configuration rules to assist in matching the second user to at least one channel.

17. The computer program product according to claim 16, wherein the rules are configured to assist in matching the second user to an event associated with providing a status update in at least one of the one or more channels.

18. The computer program product according to claim 16, wherein the configuration of rules is performed via a user interface.

19. The computer program product according to claim 16, wherein said computer readable program code is configured to automatically set a ringback tone associated with the second user based upon identification of a status update event.

20. A method of automatically constructing a status update to be used as a ringback tone, said method comprising:
- obtaining data pertaining to a user of a mobile phone from one or more communication channels, wherein the data pertaining to the user comprises at least one of: an event associated with the user and content associated with the user; wherein the one or more channels comprise at least one channel selected from the group consisting of: an enterprise system, a social network, personal information, a contacts list, an instant messaging system, a professional social network, and a personal blog; and wherein the one or more channels are selected via determining a degree of connectivity of a caller with the user;
- dynamically and automatically constructing a status update based on the obtained data; and
- using the constructed status update as a ringback tone.

* * * * *